United States Patent
Wales

(10) Patent No.: US 10,462,986 B2
(45) Date of Patent: Nov. 5, 2019

(54) SHOWER FLOWER WATER COLLECTION DEVICE

(71) Applicant: William Field Wales, Fairfield, CT (US)

(72) Inventor: William Field Wales, Fairfield, CT (US)

(*) Notice: Subject to any disclaimer, the term of this patent is extended or adjusted under 35 U.S.C. 154(b) by 0 days.

(21) Appl. No.: 15/470,765

(22) Filed: Mar. 27, 2017

(65) Prior Publication Data

US 2017/0332564 A1    Nov. 23, 2017

Related U.S. Application Data

(63) Continuation-in-part of application No. 14/484,617, filed on Sep. 12, 2014, now abandoned.

(60) Provisional application No. 61/906,285, filed on Nov. 19, 2013.

(51) Int. Cl.
| | | |
|---|---|---|
| A01G 25/14 | (2006.01) | |
| A47K 3/28 | (2006.01) | |
| E03B 1/04 | (2006.01) | |
| B67C 11/00 | (2006.01) | |
| B67C 11/02 | (2006.01) | |
| B65B 39/02 | (2006.01) | |

(52) U.S. Cl.
CPC .............. *A01G 25/14* (2013.01); *A47K 3/281* (2013.01); *B67C 11/00* (2013.01); *E03B 1/04* (2013.01); *B65B 39/02* (2013.01); *B67C 11/02* (2013.01); *E03B 2001/045* (2013.01)

(58) Field of Classification Search
CPC ..... B67C 11/00; B67C 11/02; B67C 2011/20; B65D 39/08
USPC ................................ 239/377, 378; D23/212
See application file for complete search history.

(56) References Cited

U.S. PATENT DOCUMENTS

| | | | | |
|---|---|---|---|---|
| 245,194 | A * | 8/1881 | McIntosh | A01G 25/14 239/377 |
| 1,408,865 | A * | 3/1922 | Cowell | B67C 11/02 141/338 |
| 1,461,654 | A | 7/1923 | Haessler | |
| 3,951,289 | A * | 4/1976 | Landen | B65D 41/065 215/211 |
| 4,549,668 | A * | 10/1985 | Krauss | B65D 51/1644 220/203.27 |
| D282,957 | S * | 3/1986 | Carlson | D23/212 |
| D318,095 | S | 7/1991 | Hankammer | |
| 5,488,979 | A | 2/1996 | McKenzie | |
| 5,857,504 | A * | 1/1999 | Tremblay | B67C 11/02 141/338 |
| D668,546 | S * | 10/2012 | Maas | D9/528 |
| 2006/0096909 | A1 | 5/2006 | Patch | |
| 2007/0079897 | A1* | 4/2007 | Holm | B65D 51/24 141/338 |
| 2010/0051107 | A1* | 3/2010 | Crawford | A01G 25/14 137/1 |
| 2012/0097556 | A1* | 4/2012 | Gascoine | B65D 1/0223 206/216 |

(Continued)

*Primary Examiner* — Andrew D StClair
(74) *Attorney, Agent, or Firm* — Lewis Kohn & Walker LLP; Kari Moyer-Henry

(57) ABSTRACT

A shower water collection device configured to capture pre-shower water which once full may easily be sealed to prevent contamination of the collected water until the water can be used for another purpose. A shower water collection device further including an inverted umbrella type funnel for increased surface area and enhanced water collection.

4 Claims, 9 Drawing Sheets

(56) References Cited

U.S. PATENT DOCUMENTS

2014/0338787 A1 11/2014 Tarasoff
2016/0052768 A1* 2/2016 Schmidt .................. B67C 11/02
                                                            141/337

* cited by examiner

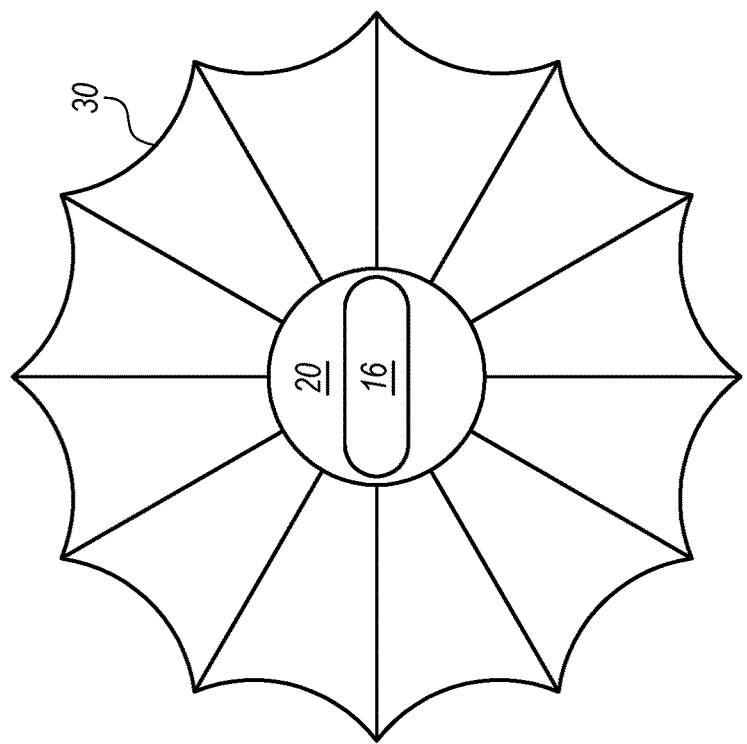
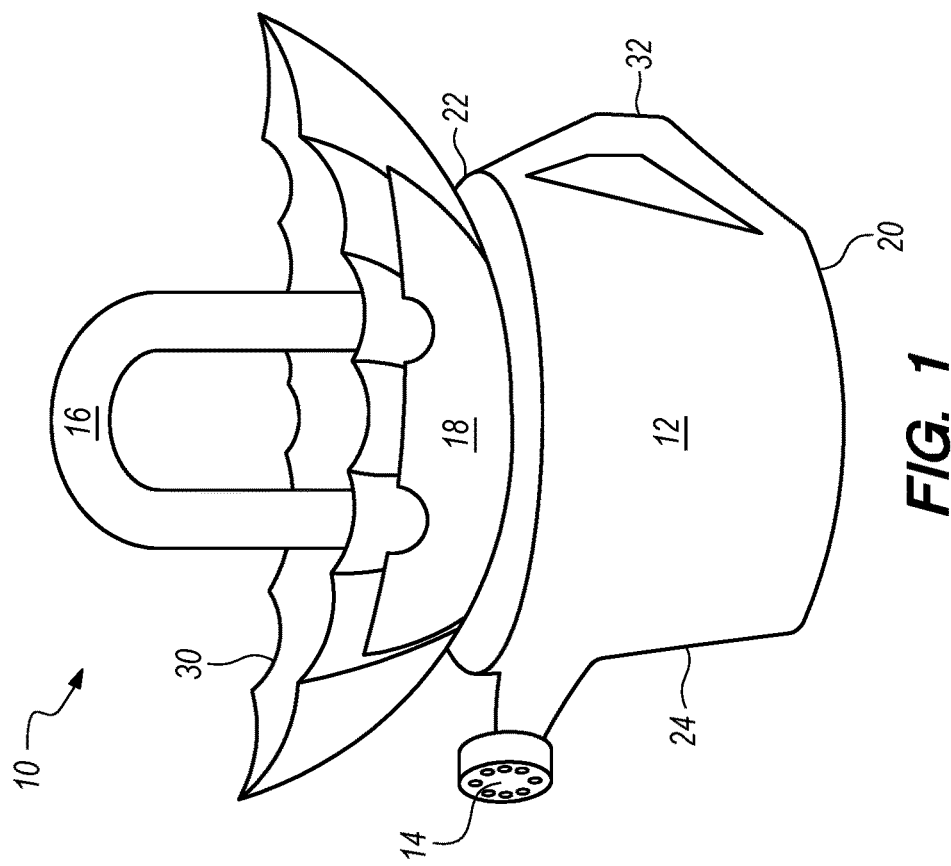

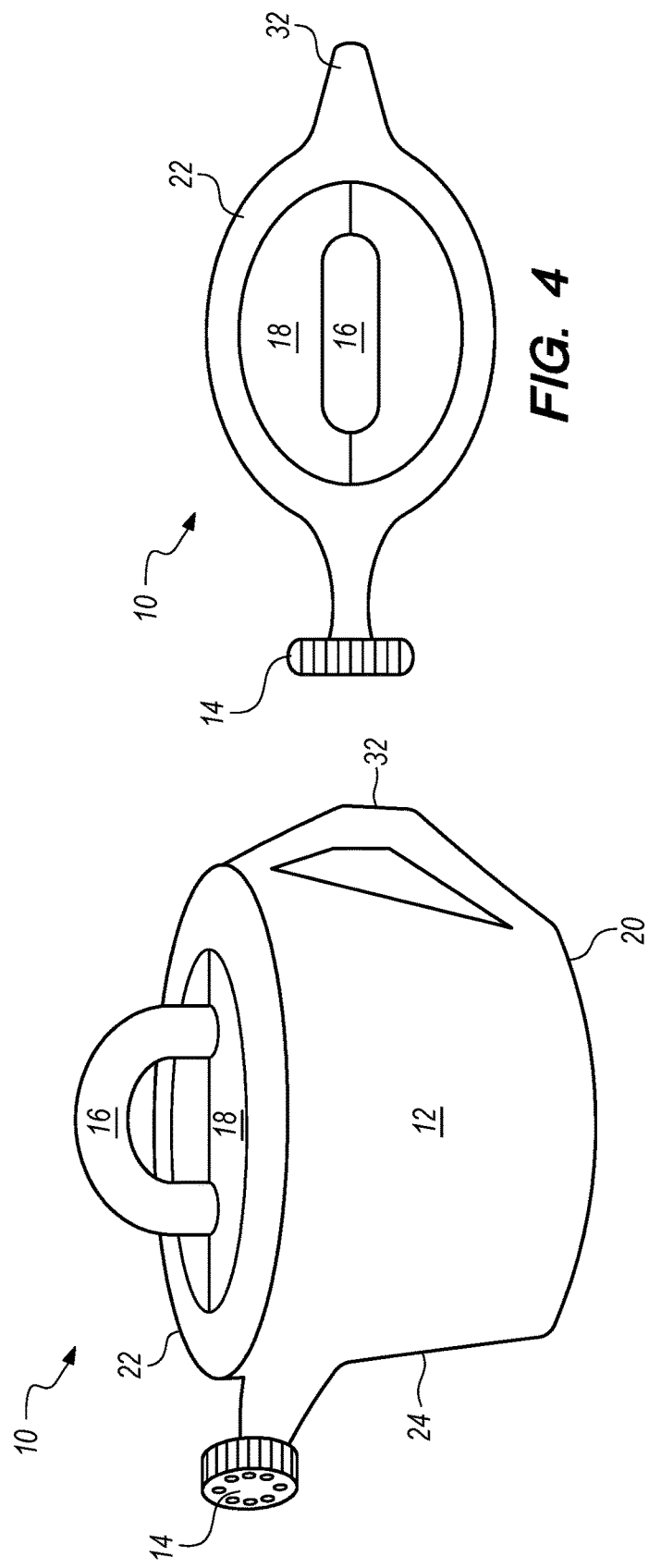

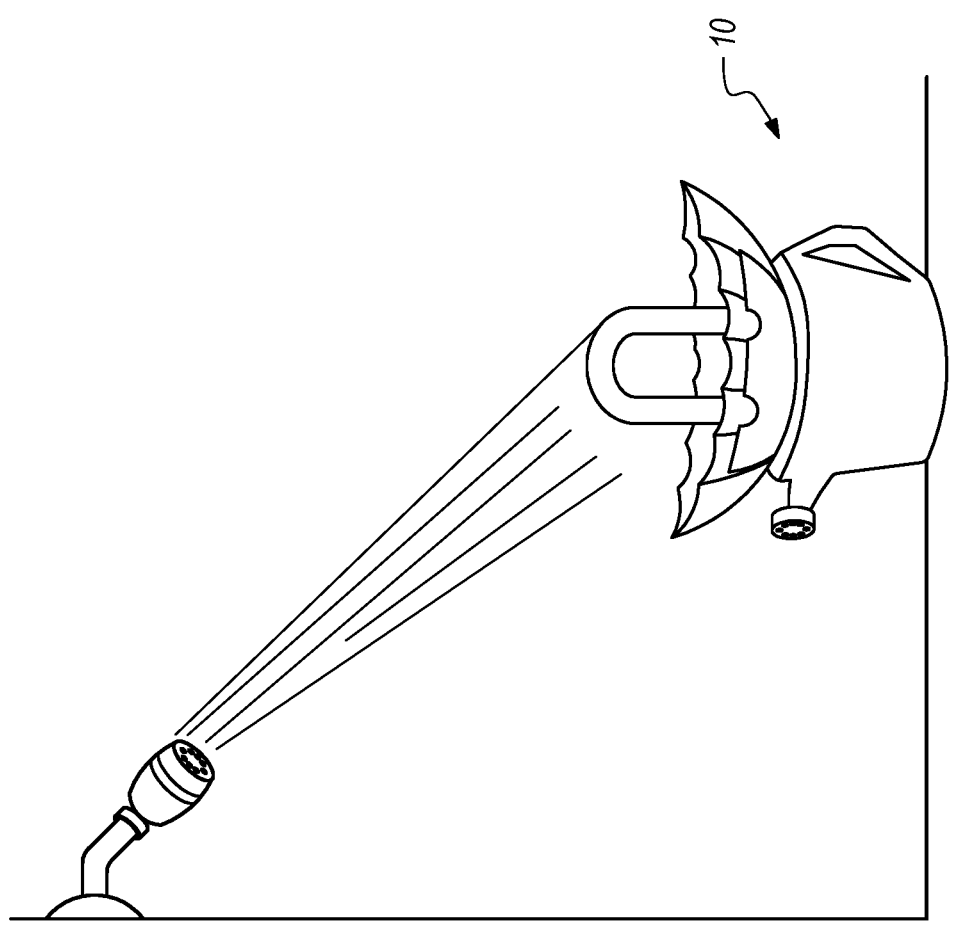

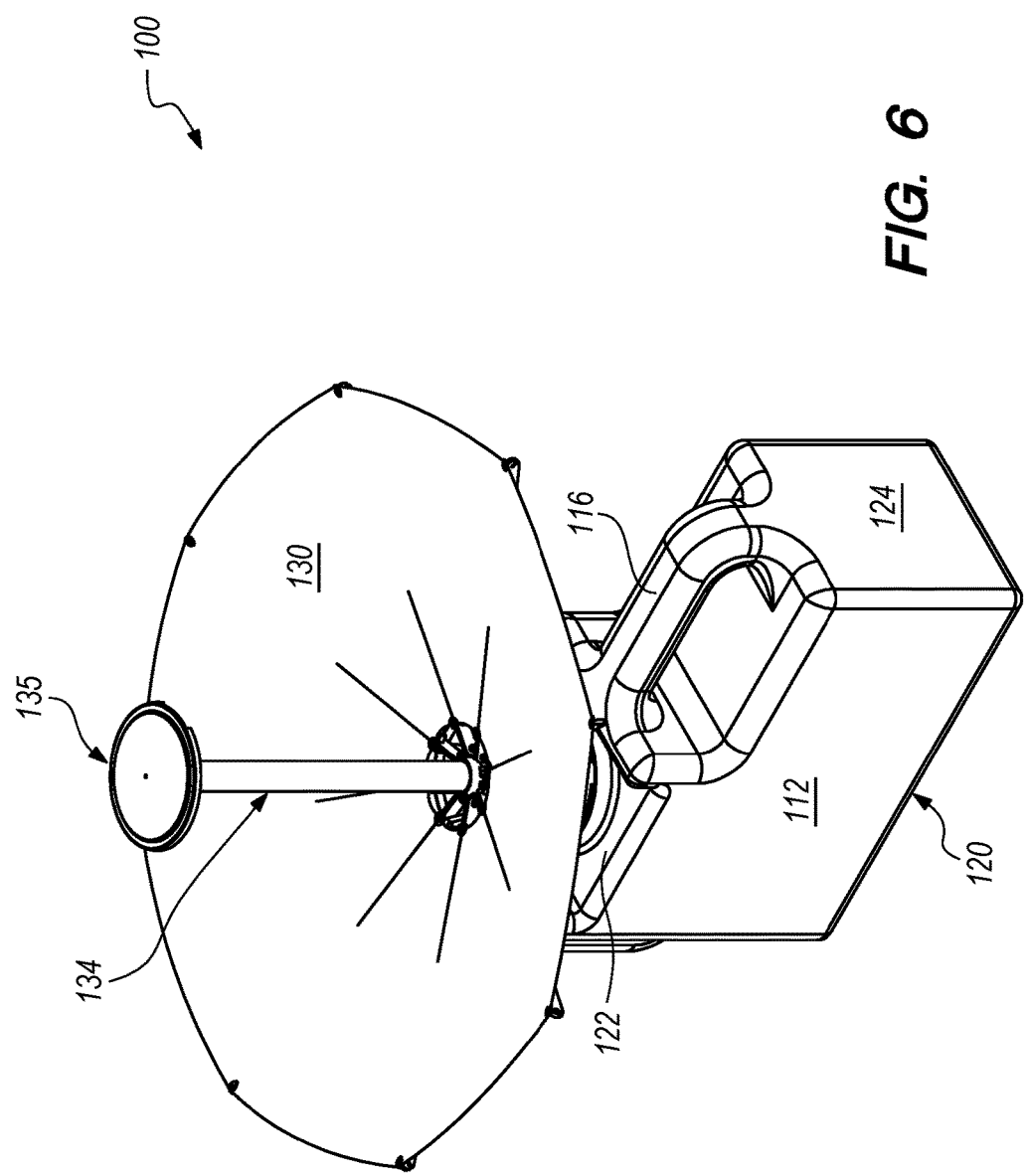

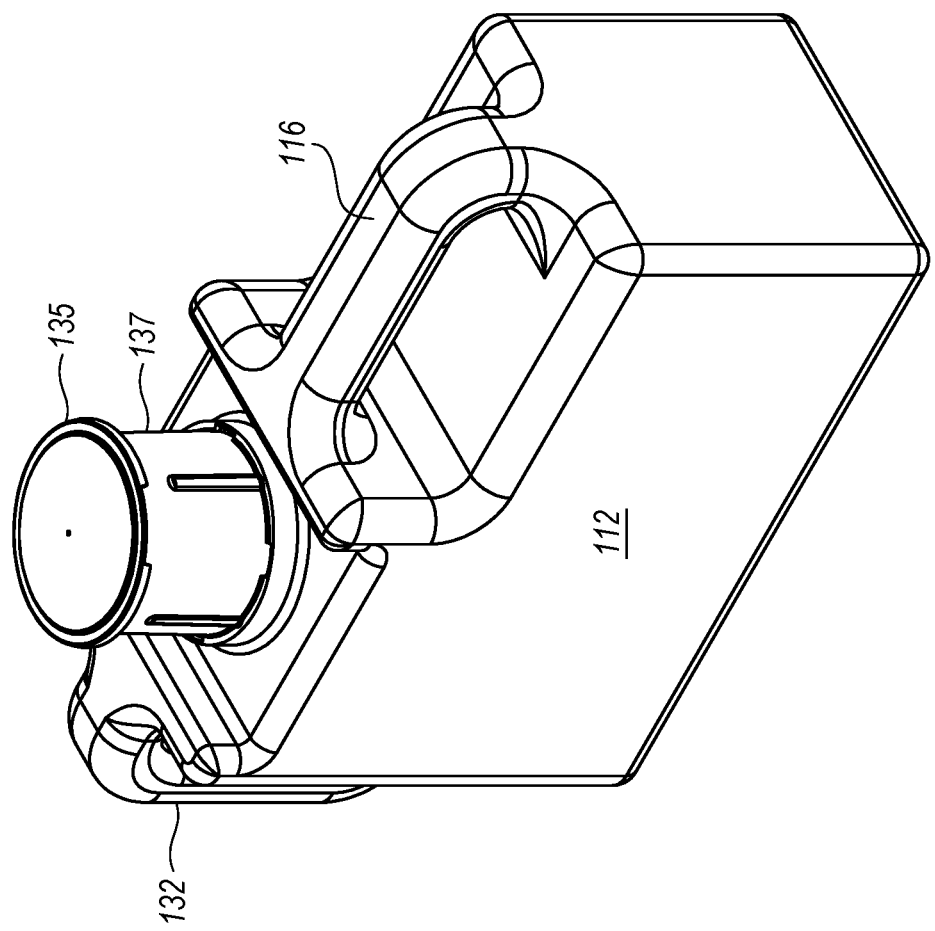

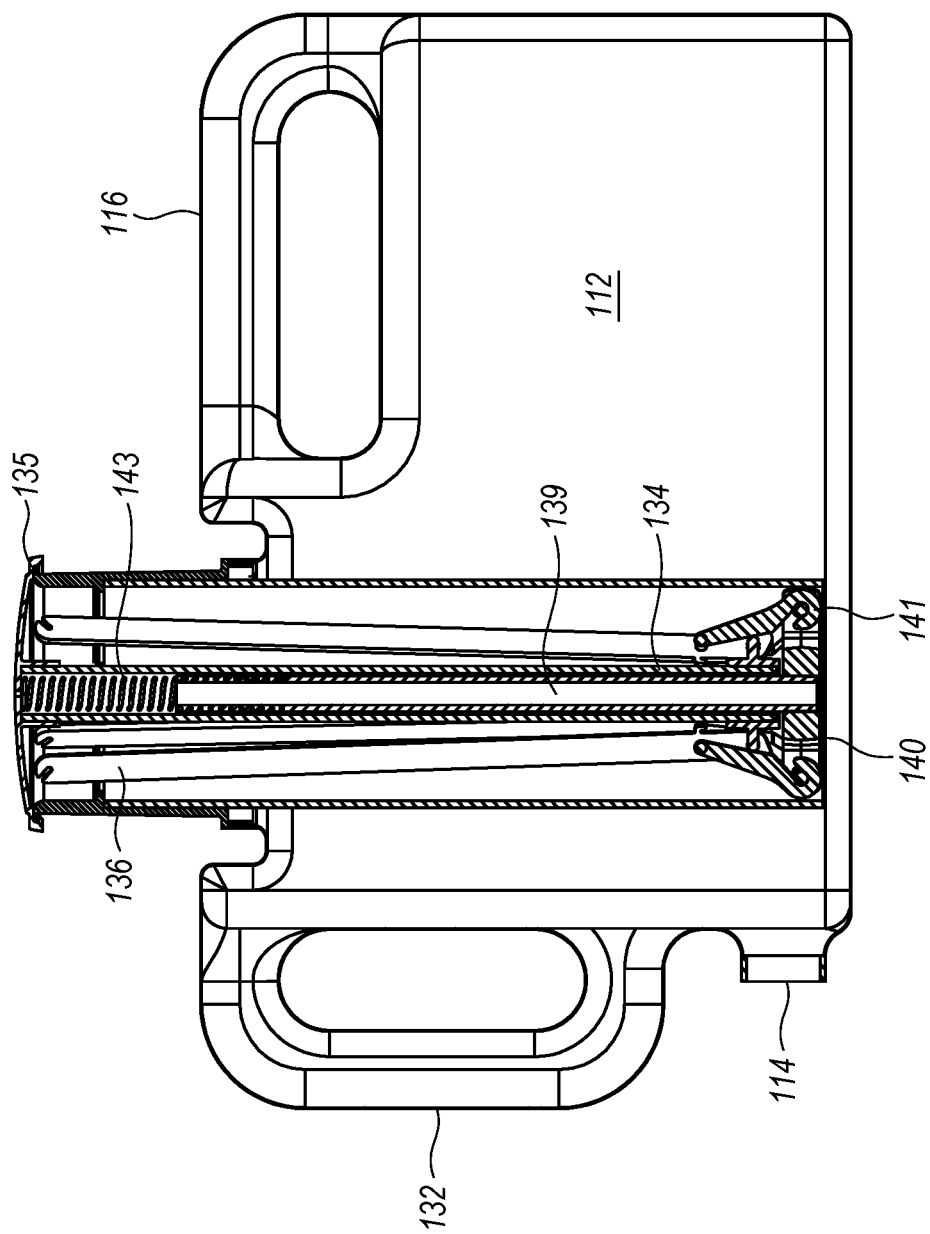

SHOWER FLOWER WATER COLLECTION DEVICE

RELATED APPLICATION

This application is a Continuation-In-Part application which claims the benefit of priority from U.S. patent application Ser. No. 14/484,617 filed Sep. 12, 2014, which claims the benefit of priority of U.S. Provisional Application No. 61/906,285 filed Nov. 19, 2013, the contents of which are incorporated hereby in its entirety by reference.

FIELD OF THE INVENTION

The present invention pertains generally to water collection devices. More particularly, the present invention pertains to a shower water collection device configured to capture pre-shower water which once full may easily be sealed to prevent contamination of the collected water until the water can be used for another purpose.

BACKGROUND OF THE ART

In 1990, 30 states in the US reported 'water-stress' conditions. In 2000, the number of states reporting water-stress rose to 40. By 2009, the number rose to 45. There is a worsening trend in water supply nationwide. Taking measures at home to conserve water not only saves you money, it also is of benefit to the greater community.

Saving water at home does not require any significant cost outlay. Although there are water-saving appliances and water conservation systems such as rain barrels, drip irrigation and on-demand water heaters which are more expensive, the bulk of water saving methods can be achieved at little cost. For example, 75% of water used indoors is in the bathroom and even the use of simple methods like tank banks, low-flow showerheads and faucet aerators cannot eliminate the habitual wasting of water by bathers. Most individuals who take a daily shower waste a significant amount of cold or lukewarm water while waiting for the shower water to heat to a preferred temperature.

A variety of shower water collection devices are known in the art, for example, U.S. Pat. No. 5,140,174 issued to Horenstein et al. discloses a device for saving water while waiting for shower water to heat up wherein the device consists of an elongated flexible and collapsible tube, the tube having a cuff at the top to remain around the shower head and a cover at the bottom, the cover to prevent grey water from collecting in the contain used with the device. This device may prove inconvenient for individuals with mobility issues and/or the elderly.

Another example, U.S. Pat. No. 5,168,586 issued to Small discloses a device for reclaiming shower waste water for use for filing toilets and watering garden, wherein the device is a molded reservoir that takes up the entire bottom of the bathtub, the reservoir being further comprised of smaller tanks that may be individually removed from the reservoir for use of the collected water. This device is large and bulky and its size alone is likely to deter many from attempting to install the device in their bathtub.

U.S. Pat. No. 5,345,625 issued to Diemand discloses a waste water recovery system including a storage tank, a suction pump connected between the shower floor drain and the tank of the toilet for supplying water for use to flush the toilet. This device requires installation of the collection tank and connector between the shower, tank and toilet.

U.S. Pat. No. 5,862,544 issued to Placencia discloses an apparatus for collecting fresh water flow from a shower including a support frame, a water flow diverter and at least one collection container supported in the frame. This apparatus requires mounting of the support frame to the wall with a plurality of lag bolts.

U.S. Pat. No. 6,581,218 issued to Koepenick discloses a water conservation system including a pair of receptacles for placement on the shower floor, one receptacle for collection of clean water and the other receptacle for collection of used shower water. The pair of receptacles requires the placement of a dowel between the receptacles to prevent movement of the receptacles during use. The requirement of the dowel may make separation of the receptacles cumbersome once use of the collected water is desired.

U.S. Pat. Pub. No. 2010/0051107 by Crawford discloses a shower water-saving device for placement in the shower to collect fresh and used water in the same container which may be transformed into a watering bucket and be used to water household plants, garden plants or lawns.

In light of the above, it is an object of the present invention to provide the desired features described herein as well as additional advantages such as being lightweight, affordable and relatively simple to manufacture.

SUMMARY OF THE INVENTION

The present invention is directed to solving the deficiency in the art pertaining to pre-shower water waste and collection. It is an object of the present invention to provide a shower water collection device that may seal to prevent the spilling of already collected pre-shower warm-up water resulting in the collection of water for future use.

It is another object of the present invention to provide a shower water collection device with a deployable umbrella type funnel for increased surface area and increased water collection. Another object of the present invention is to provide a shower water collection device with a deployable umbrella type funnel that may be hidden during non-use (i.e. closed configuration) such that the funnel folds neatly into the collection reservoir when not in use.

It is yet another object of the present invention to reduce water waste resulting from the turning on of the shower in order to allow the water to heat to the desired temperature.

It is still another object of the present invention to provide a shower water collection device that once the umbrella type funnel is deployed the device resembles a flower such that the individual segments of the funnel resemble the petals of a flower.

It is further still an object of the present invention to provide a shower water collection device that is highly portable for ease of use by adults and children.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 illustrates a side view of the shower water collection device in a first embodiment with the device in the open position.

FIG. 2 illustrates a top view of the shower water collection device shown in FIG. 1.

FIG. 3 illustrates a side view of the shower water collection device in a preferred embodiment with the device in the closed position.

FIG. 4 illustrates a top view of the shower water collection device shown in FIG. 3.

FIG. 5 illustrates a side view of the shower water collection device in use.

FIG. 6 illustrates a top perspective view of the shower water collection device in a second embodiment.

FIG. 10 illustrates a top perspective view of the shower water collection device shown in FIG. 7 in a closed position.

FIG. 11 illustrates a cross-section view of the shower water collection device shown in FIG. 7 in a closed position.

DETAILED DESCRIPTION OF THE INVENTION

Figure 7:
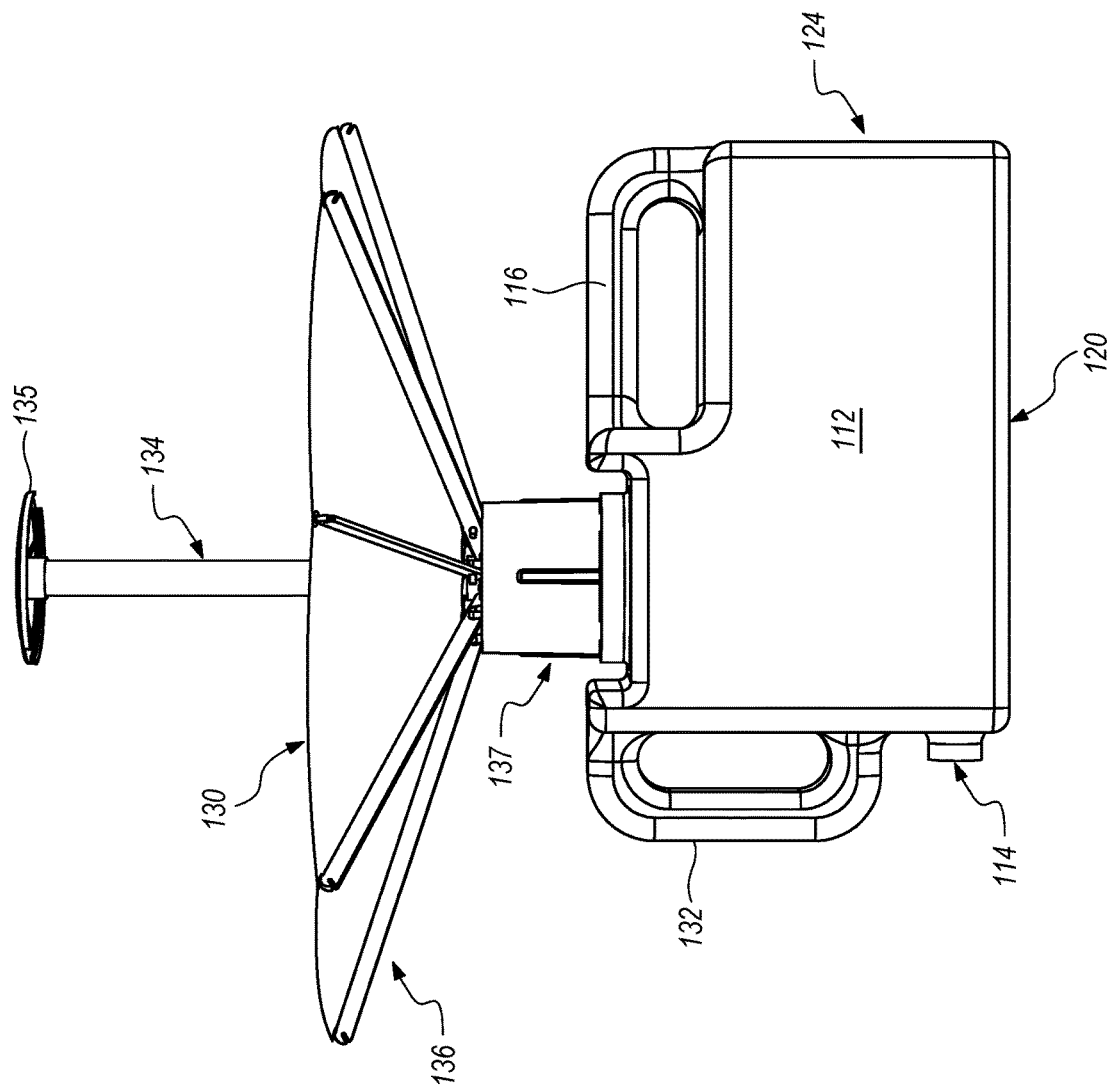
FIG. 7 illustrates a side view of the shower water collection device shown in FIG. 6.

Figures are not drawn to scale and are only provided to illustrate the instant invention. A shower water collection device is illustrated in a side perspective view in FIG. 1. The shower water collection device 10 is comprised of a reservoir 12 for collecting pre-shower warm-up water, the reservoir 12 being defined by a bottom 20 with a first diameter and a top 22 with a second diameter and at least one side wall 24 extending from the bottom 20 to the top 22 such that the side wall 24 extends at an angle greater than 90° from the bottom 20. The at least one side wall further includes a watering spout 14 for ease of watering flower beds and/or household plants. The shower water collection device 10 further includes a second handle 32 located on the at least one side wall opposite the watering spout 14 for aiding in the lifting and carrying of the device 10. The top 22 is further comprised of a seal 18 and a handle 16. The seal 18 may be in the shape of a circle with a diameter less than the diameter of the top 22. In an alternative embodiment the seal 18 may be a square or virtually any shape that allows for the proper function of the shower water collection device 10. In the open configuration, the handle 16 is extended vertically from the top 22 such that an inverted umbrella funnel 30 protrudes from the reservoir 12 and fans out at the diameter of the seal 18 to provide greater surface area for increased water collection. While the inverted umbrella funnel 30 is deployed the increased surface area of the funnel 30 allows for bulk water collection.

With reference to FIG. 2, a top view of the shower water collection device of FIG. 1 is illustrated. When the umbrella 30 is in the open position, the bottom 20 of the device can be seen encompassing the handle 16. It is this opening about the handle 16 that facilitates water collection in the reservoir of the shower water collection device.

With reference to FIG. 3, a shower water collection device in a second embodiment is illustrated in a side perspective view. Shown is the shower water collection device 10 comprised of a reservoir 12 for collecting pre-shower warm-up water, the reservoir 12 being defined by a bottom 20 with a first diameter and a top 22 with a second diameter and at least one side wall 24 extending from the bottom 20 to the top 22 such that the side wall 24 extends at an angle greater than 90° from the bottom 20. The at least one side wall further includes a watering spout 14 for ease of watering flower beds and/or household plants. The top 22 is further comprised of a seal 18 and a handle 16. In the closed configuration, the handle 16 protrudes out from the seal 18 while the seal 18 remains tightly closed around the handle 16. The closure of the seal 18 prevents contaminants such as grey shower water and soap from entering the reservoir 12 when the shower water collection device 10 is in the closed configuration.

With reference to FIG. 4, a top view of the shower water collection device of FIG. 3 is illustrated. When the umbrella (not shown) is collapsed, the seal 18 remains tightly closed about the handle 16 to prevent soapy water was entering the device during the remainder of the shower.

With reference to FIG. 5, a shower water collection device 10 is shown in use collecting pre-shower warm-up water.

With reference to FIG. 6, a top perspective view of an alternative embodiment of the shower water collection device is illustrated. The shower water collection device 100 is comprised of a reservoir 112 for collecting pre-shower warm-up water, the reservoir 112 being defined by a bottom 120 with a first perimeter and a top 122 with a second perimeter and at least one side wall 124 extending from the bottom 120 to the top 122 such that the side wall 124 extends at a 90° angle from the bottom 120. The shower water collection device 100 further includes a first handle 116 located on the at least one side wall and a second handle (not shown) adjacent the watering spout (not shown) for aiding in the lifting and carrying of the device 100. The top 122 is further comprised of a cap 135 for sealing the closed device, the cap being attached to a PVC main tube 134. The cap 135 may be in the shape of a circle. In an alternative embodiment the cap 135 may be a square or virtually any shape that allows for the proper function of the shower water collection device 100. In the open configuration, the cap 135 is extended vertically from the top 122 such that an inverted umbrella funnel 130 protrudes from the reservoir 112 and fans out at a diameter greater than the opening of the reservoir 112 to provide greater surface area for increased water collection. While the inverted umbrella funnel 130 is deployed the increased surface area of the funnel 130 allows for bulk water collection. It is further contemplated that the cap 135 may seal pressure inside the reservoir 112 to enable pressurized dispensing of collected water, i.e. spraying.

With reference to FIG. 7, a side view of the alternative embodiment of the shower water collection device is illustrated. The shower water collection device 100 is comprised of a reservoir 112 for collecting pre-shower warm-up water, the reservoir 112 being defined by a bottom 120 with a first perimeter and a top (not shown) with a second diameter and at least one side wall 124 extending from the bottom 120 to the top 122 such that the side wall 124 extends at a 90° angle from the bottom 120. The shower water collection device 100 further includes a first handle 116 located on the at least one side wall and a second handle 132 adjacent an optional watering spout 114 for aiding in the lifting and carrying of the device 100. In an alternative embodiment, the shower water collection device 100 may include a drain having a treaded cap in place of the optional watering spout 114. The top 122 is further comprised of a cap 135 for sealing the closed device, the cap 135 being attached to a PVC main tube 134. The cap 135 may be in the shape of a circle. In an alternative embodiment the cap 135 may be a square or virtually any shape that allows for the proper function of the shower water collection device 100. In the open configuration, the cap 135 is extended vertically from the top 122 such that an inverted umbrella funnel 130 protrudes from the reservoir 112 and fans out at a diameter greater than the opening of the reservoir 112 to provide greater surface area for increased water collection. While the inverted umbrella funnel 130 is deployed the increased surface area of the funnel 130 allows for bulk water collection. The inverted umbrella funnel 130 is further comprised of a long rod frame 136, the inverted umbrella 130 protruding from an opening in the top of the reservoir 112 by means of an extrusion sleeve 142.

Figure 8:
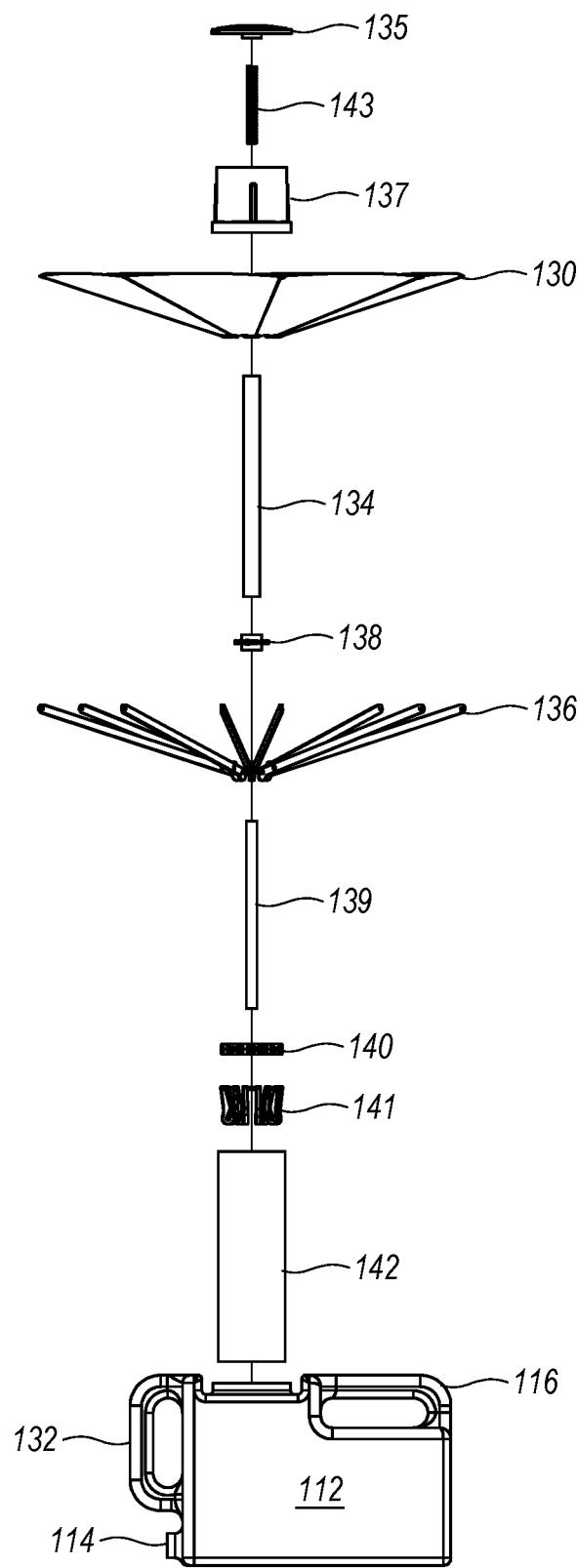
FIG. 8 illustrates an exploded view of the shower water collection device shown in FIG. 7.

With reference to FIG. 8, an exploded view of the shower water collection device 100 is illustrated.

Figure 9:
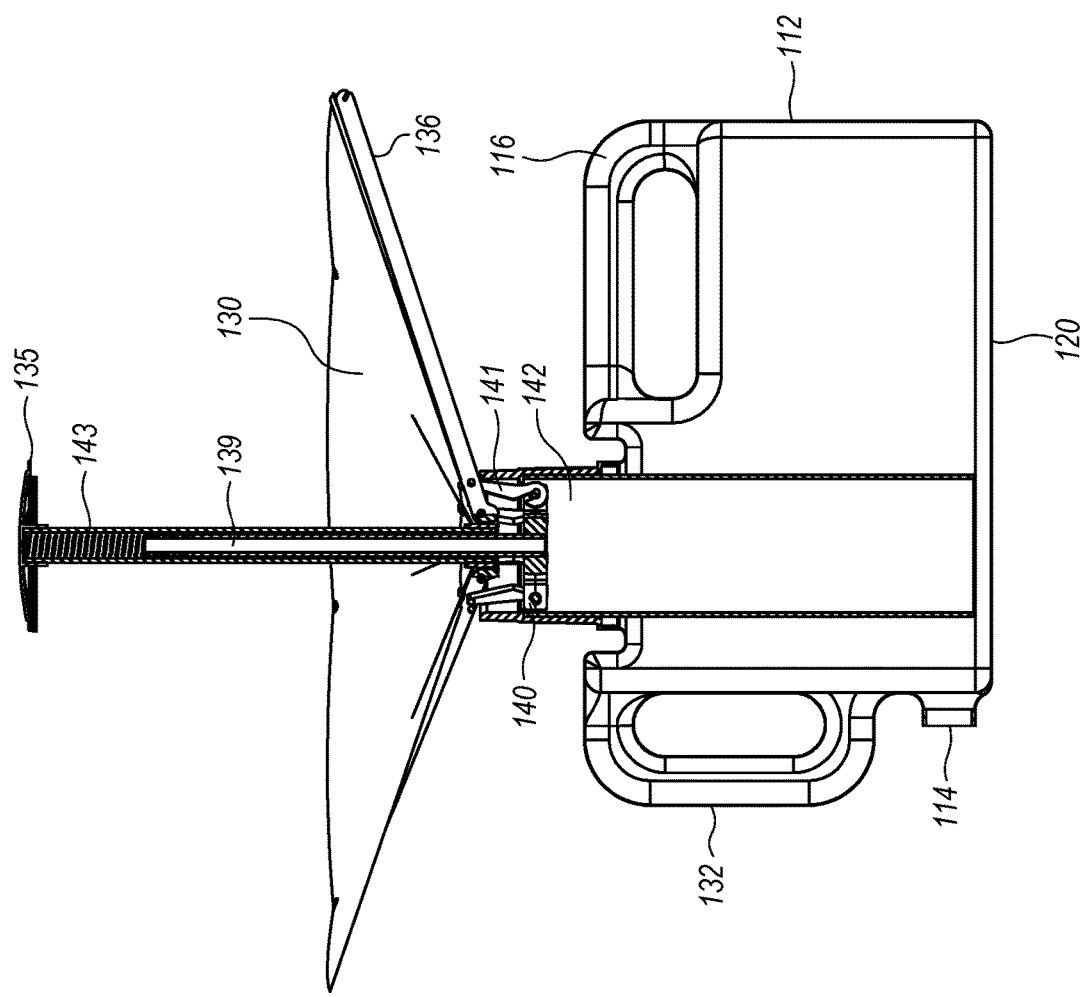
FIG. 9 illustrates a cross-section view of the shower water collection device shown in FIG. 7.

With reference to FIG. 9, a cross-section view of the inverted umbrella funnel mechanism of the shown water collection device in a deployed configuration is shown in FIG. 7 is illustrated. Specifically, the long rod frame 136 of the inverted umbrella funnel 130 configuration is attached to a molded base plate 140 by means of a molded retractor rod 141. The long rod frame 136 is also connected to the snap molded rod tie 138 which is further connected to the PVC main tube 134. The molded base plate 140 and molded retractor rod 141 are concealed within the extrusion sleeve 142, the extrusion sleeve 142 extending from the opening on top of the reservoir 120 to the bottom of the reservoir 120. Contained within the PVC main tube 134 is a PVC base tube 139 which extends from the molded base plate vertically roughly ¾ of the length of the PVC main tube 134. At the top of the PVC base tube 139 within the PVC main tube 134 rests a spring 143.

With reference to FIG. 10, a top perspective view of the shower water collection device 100 in a closed configuration is illustrated. The pressure sleeve top 137 includes protrusions around the perimeter which correspond to grooves in the collar of the pressure sleeve top 137. Rotation of the cap 135 when pressing down to close the umbrella allows for the alignment of the protrusions with the grooves such that a further turn of the cap 135 locks the umbrella in the closed position. With further reference to FIG. 11, a cross-section of the inverted umbrella funnel (not shown) in the closed position is shown. The umbrella mechanism fits neatly within the extrusion sleeve 142 which allows for sufficient space for water storage during use. Pushing down the cap forces the PVC main tube 134 downward compresses the spring 143 thereby forcing the molded base plate 140, the molded retractor rod 141 and the long rod 136 downward simultaneously. As a result, the umbrella folds inward and around the PVC main tube 134.

One embodiment of the present invention provides a shower water collection device for collecting pre-shower warm-up water that would typically be wasted. The shower water collection device may be made from blow molded plastic or metal. In a preferred embodiment the shower water collection device is made from lightweight molded plastic.

In another embodiment, the present invention provides a shower water collection device capable of being closed tightly to prevent contamination of the collected water resulting in the collection of pre-shower warm-up water for future use. In a preferred embodiment, the collected water may be used for watering of flower beds, gardens and/or lawns.

In yet another embodiment, the present invention provides a shower water collection device with an inverted umbrella type funnel for increasing surface area for increased water collection. The inverted umbrella funnel may be made of thin plastic or water proof fabric. In a preferred embodiment, the inverted umbrella funnel may be thin plastic similar to the water collection device reservoir. In a more preferred embodiment, the segments of the funnel may resemble any shape similar to the petals of a flower.

In a further still embodiment, the present invention provides a shower water collection device having an inverted umbrella funnel wherein the funnel is easily deployed for water collection and easily collapsible for storage within the reservoir of the device.

In still another embodiment, the present invention provides a shower water collection device with an optional hand pump attachment for pressurizing the reservoir in order to provide for different spray patterns. The hand pump may be further comprised of a hose, wand and interchangeable nozzle to allow for a variety of dispensing options. In a preferred embodiment, the hose, wand and nozzles may be made from molded plastic, rubber or vinyl.

In still another embodiment, the present invention provides a method for collecting pre-shower warm-up water, the method comprising the steps of:
  a) placing a shower water collection device in a shower stall or bathtub;
  b) lifting up on a handle of the shower water collection device to deploy an inverted umbrella funnel;
  c) turning on water such that water from a shower head is directed toward the inverted umbrella funnel;
  d) collecting water in the shower water collection device until a desired water temperature is reached;
  e) pushing the handle of the shower water collection device down and into the collection device reservoir thereby sealing the device; and
  f) moving the shower water collection device to one side of the shower stall or bathtub until use of the collected water is desired.

In still another embodiment, the present invention provides a method for collecting pre-shower warm-up water, the method comprising the steps of:
  a) placing a shower water collection device in a shower stall or bathtub;
  b) turning a cap of the shower water collection device to release an inverted umbrella funnel stored within the collection device;
  c) lifting the cap to fully deploy the inverted umbrella funnel in an open position;
  d) turning on water such that water from the shower head is directed toward the inverted umbrella funnel;
  e) collecting water in the shower water collection device until a desired water temperature is reached;
  f) pushing the cap of the shower water collection device down to collapse the inverted umbrella funnel for storage within the collection device reservoir thereby sealing the device; and
  g) moving the shower water collection device to one side of the shower stall or bathtub until use of the collected water is desired.

In a preferred embodiment, the collapsed inverted umbrella funnel is contained within a PVC main pipe, the PVC main pipe extending from the opening at the top of the reservoir to the bottom of the reservoir.

In yet another preferred embodiment, the inverted umbrella funnel mechanism is further comprised of a long rod frame, a molded retractor rod, a molded base plate, a PVC base tube, and a snap molded rod. In a more preferred embodiment the inverted umbrella funnel mechanism is fully contained within the PVC main pipe in the collapsed and closed position.

In yet another embodiment, the present invention provides a water collection adapter for an existing reservoir. The reservoir may be selected from the group consisting of a pail, bucket, watering can, barrel, a trash can or any reservoir that may be used to collect shower or rainwater.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular shower water collection device as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A shower water collection device comprising:
   a bottom with a first perimeter;
   a top with a second perimeter;
   at least one side wall extending from the bottom to the top such that the side wall extends at a 90° angle from the bottom;
   a spout opening located at the at least one side wall;
   at least one handle;
   an inverted umbrella funnel attached to a molded base plate wherein the inverted umbrella funnel may be deployed for water collection wherein the inverted umbrella funnel further includes a mechanism, the mechanism comprised of a rod frame comprising the frame of the inverted umbrella, a molded retractor rod positioned at the center of the mechanism equidistant from the sides of a PVC main tube and attached to a centrally located snap molded rod tie wherein the snap molded rod tie is connected to the PVC main tube, a PVC base tube wherein the PVC base tube is positioned within the PVC main tube, and the PVC main tube having a pressure sleeve top positioned adjacent thereto wherein the downward movement of the retractor rod and snap molded rod tie results in the closure of the umbrella; and
   a cap and spring combination located on the top of a reservoir for opening and closing a seal.

2. The shower water collection device of claim 1, wherein the cap requires simultaneous downward pressure and turning to release the cap and spring combination and deploy the inverted umbrella funnel.

3. The shower water collection device of claim 2, wherein the cap further includes protrusions which serve to engage grooves around the circumference of an opening in the top of the reservoir such that when the cap is pressed downward and turned the protrusions align with the grooves allowing for the upward movement of the cap.

4. The shower water collection device of claim 2, wherein the cap is connected to the PVC main pipe such that release of the cap allows for the full extension of the PVC main pipe and thereby the full deployment of the inverted umbrella funnel.

* * * * *